(12) United States Patent
Xu et al.

(10) Patent No.: US 8,890,424 B2
(45) Date of Patent: Nov. 18, 2014

(54) ILLUMINATION DEVICE, ILLUMINATION SYSTEM, AND LAMP

(75) Inventors: Lizhi Xu, Shanghai (CN); Weiqiang Zhang, Shanghai (CN); Jianping Ying, Shanghai (CN); Ching-Ho Chou, Shanghai (CN); Hsiang-Chen Wu, Shanghai (CN)

(73) Assignee: Delta Electronics (Shanghai) Co., Ltd. (CN)

( * ) Notice: Subject to any disclaimer, the term of this patent is extended or adjusted under 35 U.S.C. 154(b) by 229 days.

(21) Appl. No.: 13/547,213

(22) Filed: Jul. 12, 2012

(65) Prior Publication Data

US 2013/0207558 A1     Aug. 15, 2013

(30) Foreign Application Priority Data

Feb. 9, 2012 (CN) .......................... 2012 1 0028418
Apr. 12, 2012 (CN) .......................... 2012 1 0105314

(51) Int. Cl.
*H05B 37/00* (2006.01)

(52) U.S. Cl.
USPC .......................... 315/192; 315/224; 315/274

(58) Field of Classification Search
USPC .......... 315/185 R, 186, 192, 209 R, 224, 225, 315/246, 250, 274, 276, 291, 297, 307, 308, 315/312
See application file for complete search history.

(56) References Cited

U.S. PATENT DOCUMENTS

| 6,853,150 | B2 * | 2/2005 | Clauberg et al. | 315/185 R |
| 7,800,876 | B2 * | 9/2010 | Peker et al. | 361/86 |
| 8,330,391 | B2 * | 12/2012 | Wendt et al. | 315/307 |
| 8,508,141 | B2 * | 8/2013 | Takeda et al. | 315/192 |
| 2010/0194299 | A1 * | 8/2010 | Ye et al. | 315/192 |
| 2011/0057960 | A1 * | 3/2011 | Kim et al. | 345/690 |

* cited by examiner

*Primary Examiner* — Tung X Le
(74) *Attorney, Agent, or Firm* — Lowe Hauptman & Ham, LLP

(57) ABSTRACT

The present invention provides an illumination device, an illumination system, and a lamp. The illumination system includes the illumination device and a light modulation module. The illumination device includes a light emitting diode (LED) array, an alternating current (AC) current source, and an output power control module. The AC current source is electrically coupled to the LED array. The output power control module is electrically coupled to the LED array and the AC current source. The LED array, the AC current source, and the output power control module together form a closed-loop control loop. The light modulation module is electrically coupled to the closed-loop control loop for modulating illumination brightness of the LED.

23 Claims, 12 Drawing Sheets

ILLUMINATION DEVICE, ILLUMINATION SYSTEM, AND LAMP

TECHNICAL FIELD OF THE INVENTION

The present invention relates to a semiconductor illumination field, more particularly, to an illumination device, an illumination system, and a lamp.

BACKGROUND OF THE INVENTION

With the technical breakthroughs of manufacturing light emitting diodes (LEDs) in recent years, luminance and luminous efficiency of the LEDs are significantly improved. As a result, the LEDs gradually substitute for traditional light tubes and become new luminous elements. The LEDs are widely applied in illumination fields, such as home lighting devices, automotive lighting devices, hand-held lighting devices, backlight sources of liquid crystal panels, lighting for transportation facilities, lighting for billboards, and so on. To increase the luminance of the LEDs in use, plural LEDs are usually coupled in series to form a series assembly of LEDs.

The LEDs are direct current (DC) loads. In an electronic device in which several series assemblies of LEDs are utilized in parallel, since each LED of the series assemblies of LEDs has different characteristics and different impedance, currents flow through the series assemblies of LEDs are different. As a result, the luminance of the electronic device is not uniform, life spans of the LEDs are significantly decreased, and the electronic device is damaged.

To solve the problem that the currents which flow through the series assemblies of LEDs are not uniform, there are many current balance technologies for improving this deficiency at present. One of these current balance technologies is utilizing independent electrical energy units for respectively driving the series assemblies of LEDs. However, utilizing the independent electrical energy units leads to complicated circuits and high manufacturing cost. Furthermore, the electrical energy units have tolerances, such that a current-sharing effect is poor.

Another technology is utilizing a plurality of common mode choke coils for balancing the currents which flow through the series assemblies of LEDs. However, utilizing the common mode choke coils requires a large quantity of magnetic elements, and thus the manufacturing cost is increased and the size of the electronic device is large. Furthermore, the common mode choke coils generate excitation currents, and thus the current-sharing effect is poor.

SUMMARY OF THE INVENTION

An objective of the present invention is to provide an illumination device, an illumination system, and a lamp. The illumination device is capable of solving the problem that the currents which flow through the series assemblies of LEDs are not uniform, while the illumination system is capable modulating the currents which flow through the series assemblies of LEDs.

To solve the above-mentioned problem, the present invention provides an illumination device. The illumination device comprises a light emitting diode (LED) array and an alternating current (AC) current source. The LED array comprises a first LED assembly, a second LED assembly, a third LED assembly, a first current-sharing unit, and a second current-sharing unit. The AC current source provides power for the LED array. A first output terminal of the AC current source is electrically coupled to a first terminal of the first current-sharing unit and a positive electrode of the third LED assembly. A second terminal of the first current-sharing unit is electrically coupled to a positive electrode of the first LED assembly and a negative electrode of the second LED assembly. The first current-sharing unit is utilized for performing a current-sharing operation on the first LED assembly and the second LED assembly. A negative electrode of the first LED assembly is electrically coupled to a second output terminal of the AC current source. A first terminal of the second current-sharing unit is electrically coupled to the second output terminal of the AC current source. A second terminal of the second current-sharing unit is electrically coupled to a positive electrode of the second LED assembly and a negative electrode of the third LED assembly. The second current-sharing unit is utilized for performing a current-sharing operation on the second LED assembly and the third LED assembly.

In one embodiment of the present invention, the first current-sharing unit and the second current-sharing unit are capacitors.

In one embodiment of the present invention, the AC current source comprises a switching circuit, a resonant capacitor, and a resonant inductor. A first output terminal of the switching circuit is electrically coupled to a first terminal of the resonant capacitor. A second terminal of the resonant capacitor is electrically coupled to a first terminal of the resonant inductor. A second terminal of the resonant inductor is electrically coupled to the first output terminal of the AC current source. A second output terminal of the switching circuit is electrically coupled to the second output terminal of the AC current source.

In one embodiment of the present invention, the illumination device further comprises an isolation transformer. A first input terminal of the isolation transformer is electrically coupled to the second terminal of the resonant inductor. A second input terminal of the isolation transformer is electrically coupled to the second output terminal of the switching circuit. A first output terminal and a second output terminal of the isolation transformer are respectively served as the first output terminal and the second output terminal of the AC current source.

In one embodiment of the present invention, the AC current source further comprises an excitation inductor. A first terminal of the exciting inductor is electrically coupled to the second terminal of the resonant inductor. A second terminal of the excitation inductor is electrically coupled to the second output terminal of the switching circuit.

In one embodiment of the present invention, the first current-sharing unit and the first LED assembly of the LED array further constitute a first standard component. The second current-sharing unit and the second LED assembly further constitute a second standard component. The first standard component and the second standard component have the same internal connections and external terminals.

In one embodiment of the present invention, the first standard component further comprises a first over-voltage protection module. The second standard component further comprises a second over-voltage protection module. The first over-voltage protection module is coupled to the first LED assembly in parallel. The second over-voltage protection module is coupled to the second LED assembly in parallel. The first over-voltage protection module and the second over-voltage protection module are respectively utilized for preventing voltages across the first LED assembly and the second LED assembly from exceeding a predetermined value.

In one embodiment of the present invention, the first standard component further comprises a first rectifying diode which is coupled to the first LED assembly in series in the same direction. The second standard component further comprises a second rectifying diode which is coupled to the second LED assembly in series in the same direction.

In one embodiment of the present invention, the first standard component further comprises a first filtering capacitor which is coupled to the first LED assembly in parallel. The second standard component further comprises a second filtering capacitor which is coupled to the second LED assembly in parallel.

In one embodiment of the present invention, the first standard component further comprises a first over-voltage protection diode. The second standard component further comprises a second over-voltage protection diode. The first over-voltage protection diode is coupled to the first LED assembly in series in the same direction. The second over-voltage protection diode is coupled to the second LED assembly in series in the same direction. The first over-voltage protection diode and the second over-voltage protection diode are respectively utilized for preventing voltages between two terminals of the first LED assembly and the second LED assembly from exceeding another predetermined value.

The present invention further provides an illumination system. The illumination system comprises an illumination device and a light modulation module. The illumination device comprises a light emitting diode (LED) array, an alternating current (AC) current source, and an output power control module. The AC current source is electrically coupled to the LED array for providing power for the LED array. The output power control module is electrically coupled to the LED array and the AC current source. The LED array provides information on an internal current of the LED array for the output power control module. The LED array, the AC current source, and the output power control module together form a closed-loop control loop for implementing a closed-loop control on an output power of the AC current source. The light modulation module is electrically coupled to the closed-loop control loop for modulating illumination brightness of the LED array.

In one embodiment of the present invention, the LED array comprises a first LED assembly, a second LED assembly, a third LED assembly, a first current-sharing unit, and a second current-sharing unit. A first output terminal of the AC current source is electrically coupled to a first terminal of the first current-sharing unit and a positive electrode of the third LED assembly. A second terminal of the first current-sharing unit is electrically coupled to a positive electrode of the first LED assembly and a negative electrode of the second LED assembly. The first current-sharing unit is utilized for performing a current-sharing operation on the first LED assembly and the second LED assembly. A negative electrode of the first LED assembly is electrically coupled to a second output terminal of the AC current source. A first terminal of the second current-sharing unit is electrically coupled to the second output terminal of the AC current source. A second terminal of the second current-sharing unit is electrically coupled to a positive electrode of the second LED assembly and a negative electrode of the third LED assembly. The second current-sharing unit is utilized for performing a current-sharing operation on the second LED assembly and the third LED assembly.

In one embodiment of the present invention, the output power control module comprises a current comparator, a proportional plus integral controller, and a switching circuit driver. A first input terminal of the current comparator is electrically coupled to the LED array for obtaining a current value of the LED array. A second input terminal of the current comparator is electrically coupled to the light modulation module for obtaining a reference current value. An input terminal of the proportional plus integral controller is electrically coupled to an output terminal of the current comparator. An output terminal of the proportional plus integral controller is electrically coupled to an input terminal of the switching circuit driver for modulating an output frequency of the switching circuit driver according to an output of the current comparator. An output terminal of the switching circuit driver is electrically coupled to the AC current source for modulating an output power of the AC current source.

In one embodiment of the present invention, the LED array further comprises a sampling resistor which is coupled to one of the first LED assembly, the second LED assembly, and the third LED assembly in series. The current comparator obtains the current value of the LED array by obtaining a voltage value across the sampling resistor.

In one embodiment of the present invention, the LED array further comprises a sampled inductor which is coupled to one of the first LED assembly, the second LED assembly, and the third LED assembly in series. The current comparator obtains the current value of the LED array by disposing a coupled inductor which is coupled to the sampled inductor.

In one embodiment of the present invention, the output power control module comprises a proportional plus integral controller and a switching circuit driver. An input terminal of the proportional plus integral controller is electrically coupled to the LED array. An output terminal of the proportional plus integral controller is electrically coupled to an input terminal of the switching circuit driver. An output terminal of the switching circuit driver is electrically coupled to the AC current source for modulating an output power of the AC current source. An output terminal of the light modulation module is electrically coupled to the switching circuit driver for directly modulating an output frequency of the switching circuit driver, so as to modulate the output power of the AC current source and the illumination brightness of the LED array.

In one embodiment of the present invention, the LED array further comprises a controllable switch. The controllable switch is coupled to one of the first LED assembly, the second LED assembly, and the third LED assembly in parallel. The light modulation module is electrically coupled to the controllable switch for controlling the controllable switch to be turned on or turned off, so as to control an operation state of the LED assembly which is electrically coupled to the controllable switch and to control the illumination brightness of the LED array.

The prevent invention further provides a lamp. The lamp comprises a lamp board; and a driving board. The driving board is electrically coupled to the lamp board through wirings. The lamp board comprises a light emitting diode (LED) array. The driving board comprises an alternating current (AC) current source. The LED assay comprises a first LED assembly, a second LED assembly, a third LED assembly, a first current-sharing unit, and a second current-sharing unit.

In one embodiment of the present invention, the first current-sharing unit and the first LED assembly of the LED array further constitute a first standard component. The second current-sharing unit and the second LED assembly further constitute a second standard component. The first standard component and the second standard component have the same internal connections and external terminals.

In one embodiment of the present invention, the first standard component further comprises a first over-voltage protection module. The second standard component further comprises a second over-voltage protection module. The first over-voltage protection module is coupled to the first LED assembly in parallel. The second over-voltage protection module is coupled to the second LED assembly in parallel. The first over-voltage protection module and the second over-voltage protection module are respectively utilized for preventing voltages across the first LED assembly and the second LED assembly from exceeding a predetermined value.

In one embodiment of the present invention, the first standard component further comprises a first rectifying diode which is coupled to the first LED assembly in series in the same direction. The second standard component further comprises a second rectifying diode which is coupled to the second LED assembly in series in the same direction.

In one embodiment of the present invention, the first standard component further comprises a first filtering capacitor which is coupled to the first LED assembly in parallel. The second standard component further comprises a second filtering capacitor which is coupled to the second LED assembly in parallel.

In one embodiment of the present invention, the first standard component further comprises a first over-voltage protection diode. The second standard component further comprises a second over-voltage protection diode. The first over-voltage protection diode is coupled to the first LED assembly in series in the same direction. The second over-voltage protection diode is coupled to the second LED assembly in series in the same direction. The first over-voltage protection diode and the second over-voltage protection diode are respectively utilized for preventing voltages between two terminals of the first LED assembly and the second LED assembly from exceeding another predetermined value.

In one embodiment of the present invention, the driving board further comprises a light modulation module and an output power control module. The AC current source is electrically coupled to the LED array for providing power for the LED array. The output power control module is electrically coupled to the LED array and the AC current source, the LED array is utilized for providing information on an internal current of the LED array for the output power control module. The LED array, the AC current source, and the output power control module together form a closed-loop control loop for implementing a closed-loop control on an output power of the AC current source. The light modulation module is electrically coupled to the closed-loop control loop for modulating illumination brightness of the LED array.

An advantage of the present invention is that the illumination device disposes the current-sharing units based on the ampere-second balance, such that the currents which flow through the LED assemblies are uniform and thus the problem that the currents which flow through the LED assemblies are not uniform is solved. Furthermore, in the illumination system of the present invention, the objective of modulating the illumination brightness of the LED array is implemented by disposing the light modulation module and electrically coupling the light modulation module to the closed-loop control loop in the illumination device.

DETAILED DESCRIPTION OF THE INVENTION

Figure 1A:
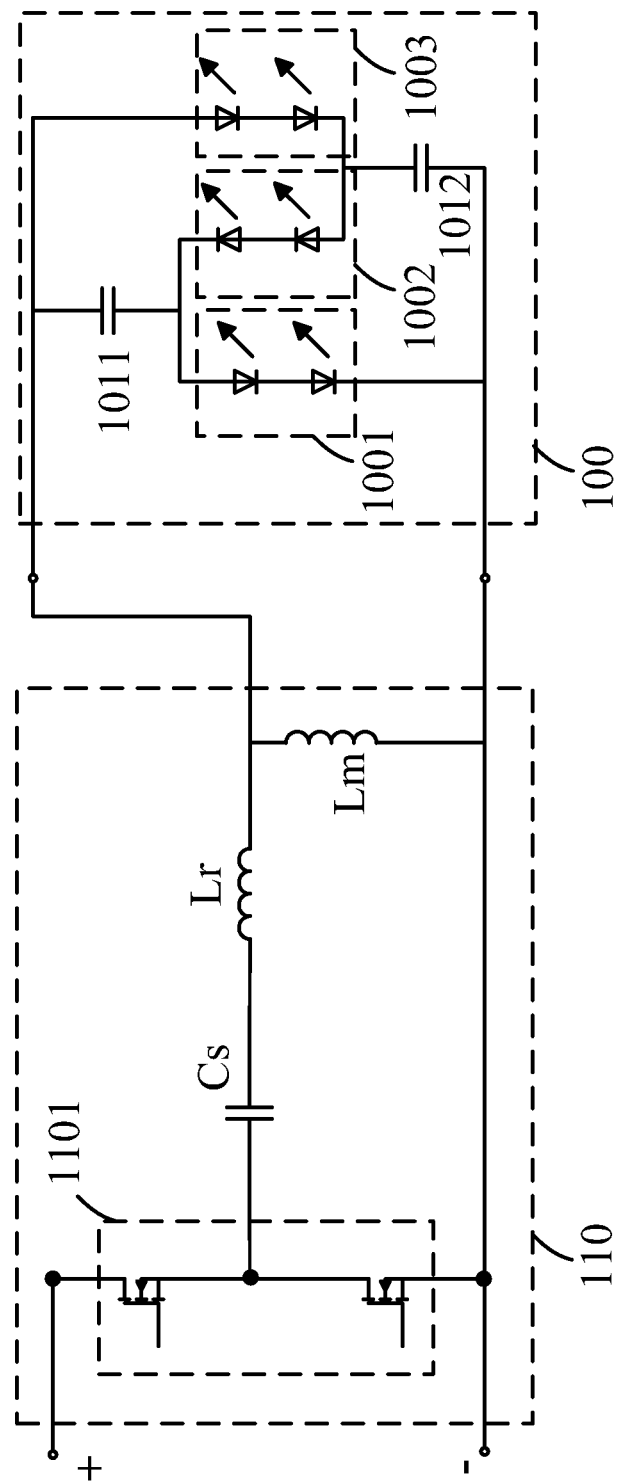
FIG. 1A is a schematic diagram showing an illumination device according to a first embodiment of the present invention.

FIG. 1A is a schematic diagram showing an illumination device according to a first embodiment of the present invention. The illumination device comprises a light emitting diode (LED) array 100 and an alternating current (AC) current source 110. The LED array 100 comprises a first LED assembly 1001, a second LED assembly 1002, a third LED assembly 1003, a first current-sharing unit 1011, and a second current-sharing unit 1012. The AC current source 110 is utilized for providing power for the LED array 100.

A first output terminal of the AC current source 110 is electrically coupled to a first terminal of the first current-sharing unit 1011 and a positive electrode of the third LED assembly 1003. A second terminal of the first current-sharing unit 1011 is electrically coupled to a positive electrode of the first LED assembly 1001 and a negative electrode of the second LED assembly 1002. The first current-sharing unit 1011 is utilized for performing a current-sharing operation on the first LED assembly 1001 and the second LED assembly 1002. A negative electrode of the first LED assembly 1001 is electrically coupled to a second output terminal of the AC current source 110. A first terminal of the second current-sharing unit 1012 is electrically coupled to the second output terminal of the AC current source 110. A second terminal of the second current-sharing unit 1012 is electrically coupled to a positive electrode of the second LED assembly 1002 and a negative electrode of the third LED assembly 1003. The second current-sharing unit 1012 is utilized for performing a current-sharing operation on the second LED assembly 1002 and the third LED assembly 1003.

In the present embodiment, the first current-sharing unit 1011 and the second current-sharing unit 1012 are capacitors. The AC current source 110 provides power for the first LED assembly 1001, the second LED assembly 1002, and the third LED assembly 1003 through the first current-sharing unit 1011 and the second current-sharing unit 1012. Based on the ampere-second balance in a capacitor, absolute values of ampere seconds at two terminals of the capacitor are the same in a steady state. Specifically, an algebraic sum of an ampere-second integration of the capacitor is zero. That is, an algebraic sum of a current, which flows through the capacitor, is zero. In the circuit of the embodiment in FIG. 1A, both the first LED assembly 1001 and the second LED assembly 1002 are electrically coupled to the first current-sharing unit 1011, and the first LED assembly 1001 and the second LED assembly 1002 have opposite polarities. Accordingly, average currents which flow through the first LED assembly 1001 and the second LED assembly 1002 must be the same. Similarly, average currents which flow through the second LED assembly 1002 and the third LED assembly 1003 must be the same as well. Accordingly, if every two adjacent LED assemblies which have opposite polarities and are electrically coupled to the same current-sharing unit are disposed in the circuit in FIG. 1A, the average currents which flow through the every two adjacent LED assemblies must be the same as well.

The AC current source 110 comprises a switching circuit 1101, a resonant capacitor Cs, and a resonant inductor Lr. Input terminals of the switching circuit 1101 are electrically coupled to a direct current (DC) voltage source. A first output terminal of the switching circuit 1101 is electrically coupled to a first terminal of the resonant capacitor Cs. A second terminal of the resonant capacitor Cs is electrically coupled to a first terminal of the resonant inductor Lr. A second terminal of the resonant inductor Lr is electrically coupled to the first output terminal of the AC current source 110. A second output terminal of the switching circuit 1101 is electrically coupled to the second output terminal of the AC current source 110. In the present embodiment, the switching circuit 1101 is a half-bridge inverter circuit. In another embodiment, the switching circuit 1101 may be a full-bridge inverter circuit or a circuit having an inverter function. The switching circuit 1101 inverts an inputted DC voltage to a square wave voltage signal. The square wave voltage signal flows to a circuit network comprising the resonant capacitor Cs, the resonant inductor Lr, and the three LED assemblies (i.e. 1001, 1002, and 1003). According to circuit topologies, the resonant capacitor Cs and the resonant inductor Lr are coupled in series to constitute a series resonant circuit, and thus the AC current source 110 may be regarded as a series resonant inverter.

An output current of the AC current source 110 is not surging due to the resonant inductor Lr. This is because the current of the resonant inductor Lr must be varied continuously. That is, the AC current source 110 does not generate a surging current as compared with other types of power sources. Accordingly, the currents which flow through the LED assemblies (i.e. 1001, 1002, 1003) are smooth, such that root-mean-square currents which flow through the LED assemblies (i.e. 1001, 1002, 1003) tend to be the same as the average current, and life spans of the LED assemblies (i.e. 1001, 1002, 1003) may be extended.

The AC current source 110 further comprises an excitation inductor Lm. A first terminal of the exciting inductor Lm is electrically coupled to the second terminal of the resonant inductor Lr, and a second terminal of the excitation inductor Lm is electrically coupled to the second output terminal of the switching circuit 1101. The excitation inductor Lm functions to superimpose a DC current component to the output signal of the AC current source 110. In the present embodiment, an arrangement direction of the first LED assembly 1001 is the same as an arrangement direction of the third LED assembly 1003, while an arrangement of the second LED assembly 1002 is different from those of the first and third LED assemblies 1001, 1003. The arrangement directions of the first LED assembly 1001, the second LED assembly 1002, and the third LED assembly 1003 are alternately opposite. When a number of the LED assemblies in one direction is different from a number of the LED assemblies in an opposite direction, an integral value of a required positive current and an integral value of a required negative current in a load are asymmetric. Accordingly, the excitation inductor Lr is required for providing the DC current component, so as to meet the requirement for a symmetry breaking.

Figure 1B:
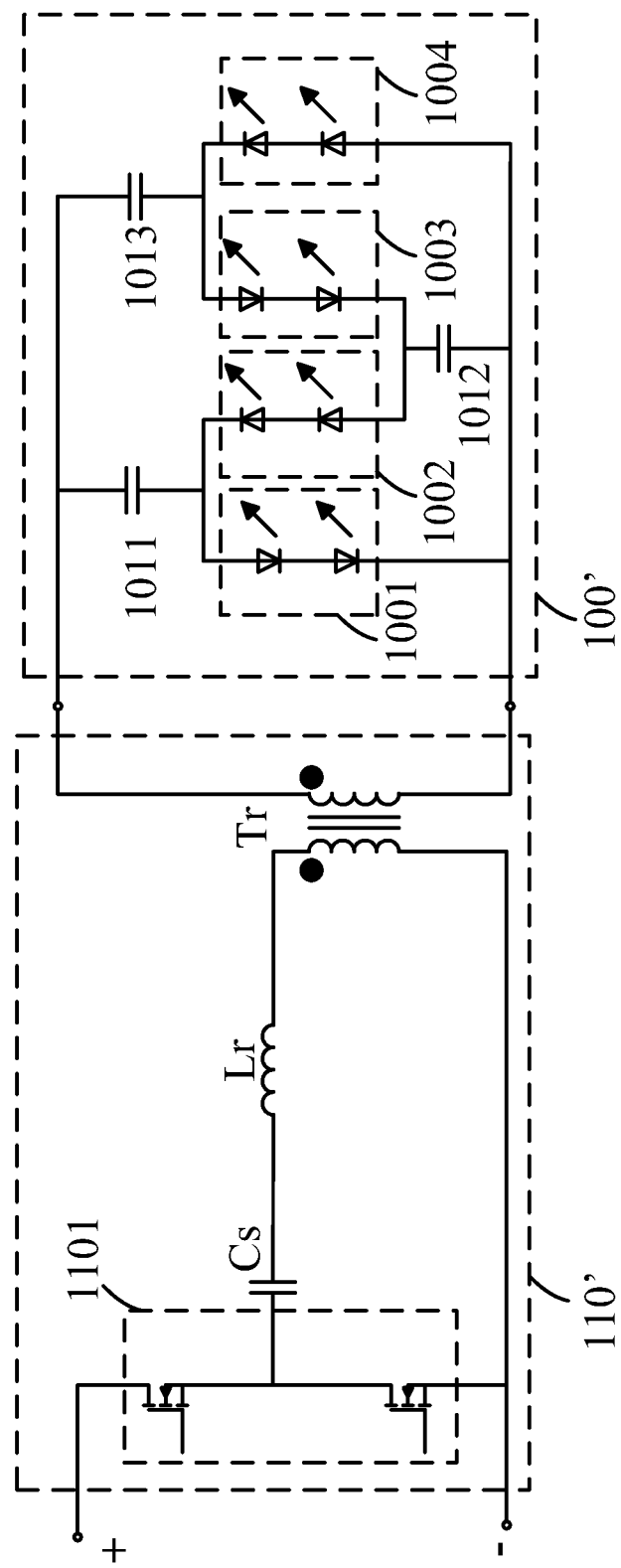
FIG. 1B is a schematic diagram showing an illumination device according to a second embodiment of the present invention.

FIG. 1B is a schematic diagram showing an illumination device according to a second embodiment of the present invention. An AC current source 110' in the present embodiment further comprises an isolation transformer Tr as compared with the first embodiment. A first input terminal of the isolation transformer Tr is electrically coupled to the second terminal of the resonant inductor Lr, and a second terminal of the isolation transformer Tr is electrically coupled to the second output terminal of the switching circuit 1101. A first output terminal and a second output terminal of the isolation transformer Tr are respectively served as a first output terminal and a second output terminal of the AC current source 110'.

Another difference between the first embodiment and the present embodiment is that an LED array 100' of the present embodiment further comprises a fourth LED assembly 1004 and a third current-sharing unit 1013. The connections of the two elements meet the connection principle in FIG. 1A. Specific connections are shown in FIG. 1B. An integral value of a required positive current and an integral value of a required negative current in a load are symmetric because of the newly added LED assembly 1004. As a result, the excitation inductor Lr in FIG. 1A is not required for providing an extra DC component.

When the circuit structure in FIG. 1A or FIG. 1B is applied in practice, the LED array 100 or the LED array 100' may be manufactured as a lamp board, and the AC current source 110 or the AC current source 110' may be manufactured as a driving board. The lamp board and the driving board may be manufactured and sold, respectively. It can be seen from FIG. 1A and FIG. 1B that the lamp board and the driving board are easily manufactured and assembled since each of the lamp board and the driving board have only two external terminals.

Figure 1C:
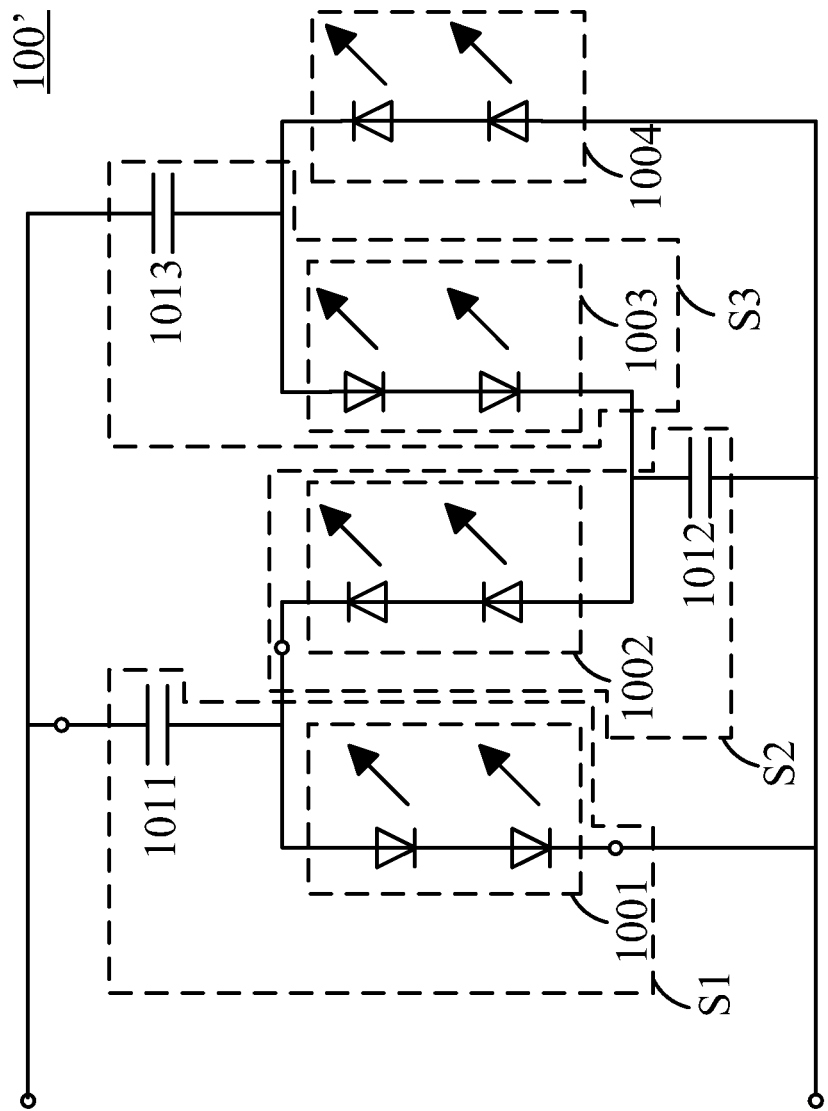
FIG. 1C is a schematic diagram showing that the LED array in FIG. 1B is divided into a plurality of standard components.

FIG. 1C is a schematic diagram showing that the LED array 100' in FIG. 1B is divided into a plurality of standard components. In the LED array 100' manufactured as the lamp board, the first current-sharing unit 1011 and the first LED assembly 1001 may further constitute a first standard component S1, the second current-sharing unit 1012 and the second LED assembly 1002 may further constitute a second standard component S2, and the third current-sharing unit 1013 and the third LED assembly 1003 may further constitute a third standard component S3. The first standard component S1, the second standard component S2, and the third standard component S3 substantially have the same internal connections and external terminals except that representing manners are different. Furthermore, each of the standard components (i.e. S1, S2, S3) comprises three terminals, and thus the arrangements in FIG. 1A and FIG. 1B may be implemented by coupling these standard components and then coupling the fourth LED assembly 1004 to be served as an end element. As a result, it is a benefit to manufacture the LED array 100'. In manufacturing processes, plural standard components (i.e. S1, S2, S3) as shown in FIG. 1C may be manufactured firstly, and then the LED arrays having different numbers of the standard components are manufactured according to customer requirements, such that the customer requirements are achieved by the above-mentioned standardized manufacturing processes and the manufacturing cost is decreased.

An illumination system according to a first embodiment of the present invention is provided in conjunction with appending drawings in the following.

Figure 2A:
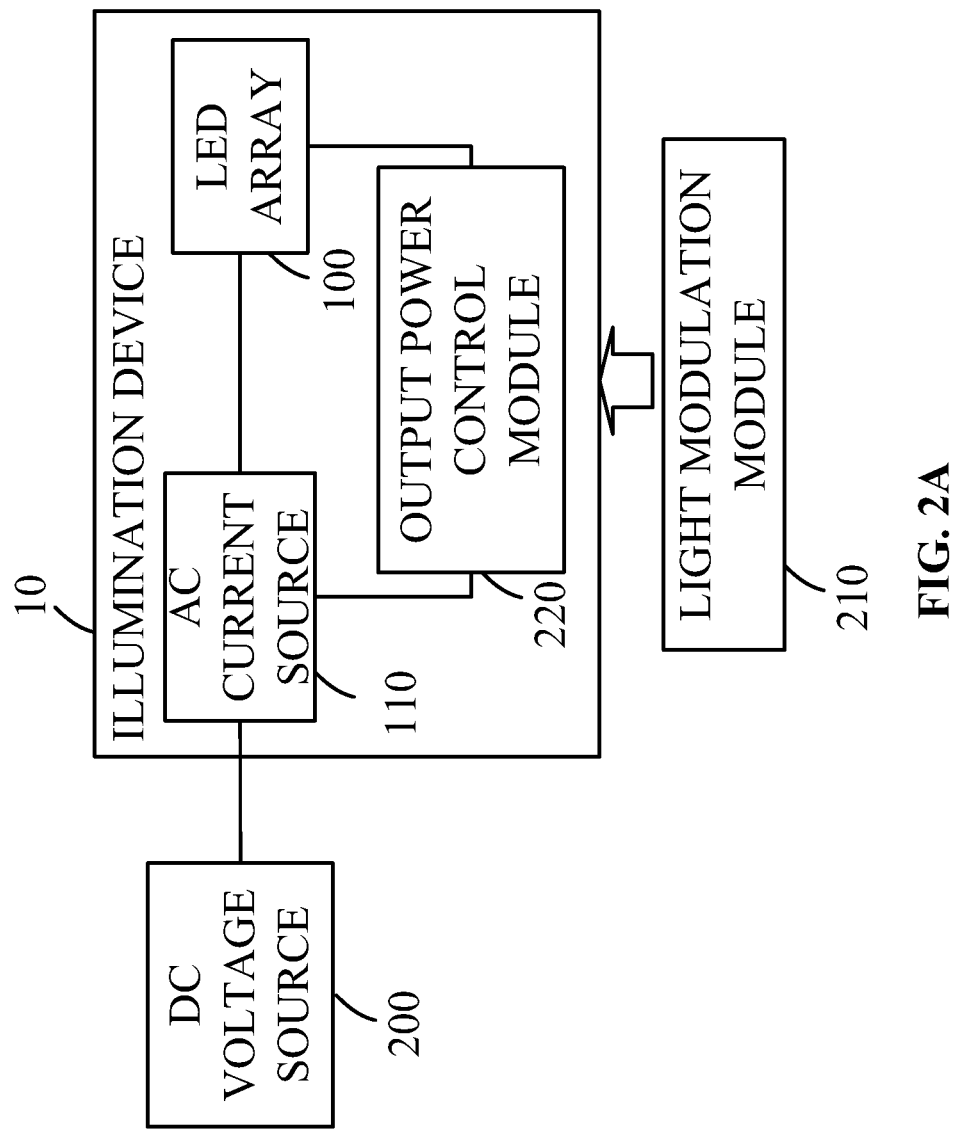
FIG. 2A is a block diagram of the illumination system according to the first embodiment of the present invention.

FIG. 2A is a block diagram of the illumination system according to the first embodiment of the present invention. The illumination system comprises a DC voltage source 200, an illumination device 10, and a light modulation module 210. The illumination device 10 comprises an LED array 100, an AC current source 110, and an output power control module 220. The DC voltage source 200 is electrically coupled to the AC current source 110 of the illumination device 10 and used for providing power for the AC current source 110. The AC current source 110 is electrically coupled to the LED array 100 and used for providing power for the LED array 100. The LED array 100 is electrically coupled to the output power control module 220 and used for providing information on an internal current of the LED array 100 for the output power control module 220. The output power control module 220 is further electrically coupled to the AC current source 110. The LED array 100, the AC current source 110, and the output power control module 220 together form a closed-loop control loop for implementing a closed-loop control on an output power of the AC current source 110. The light modulation module 210 is electrically coupled to the closed-loop control loop for modulating illumination brightness of the LED array 100.

Figure 2B:
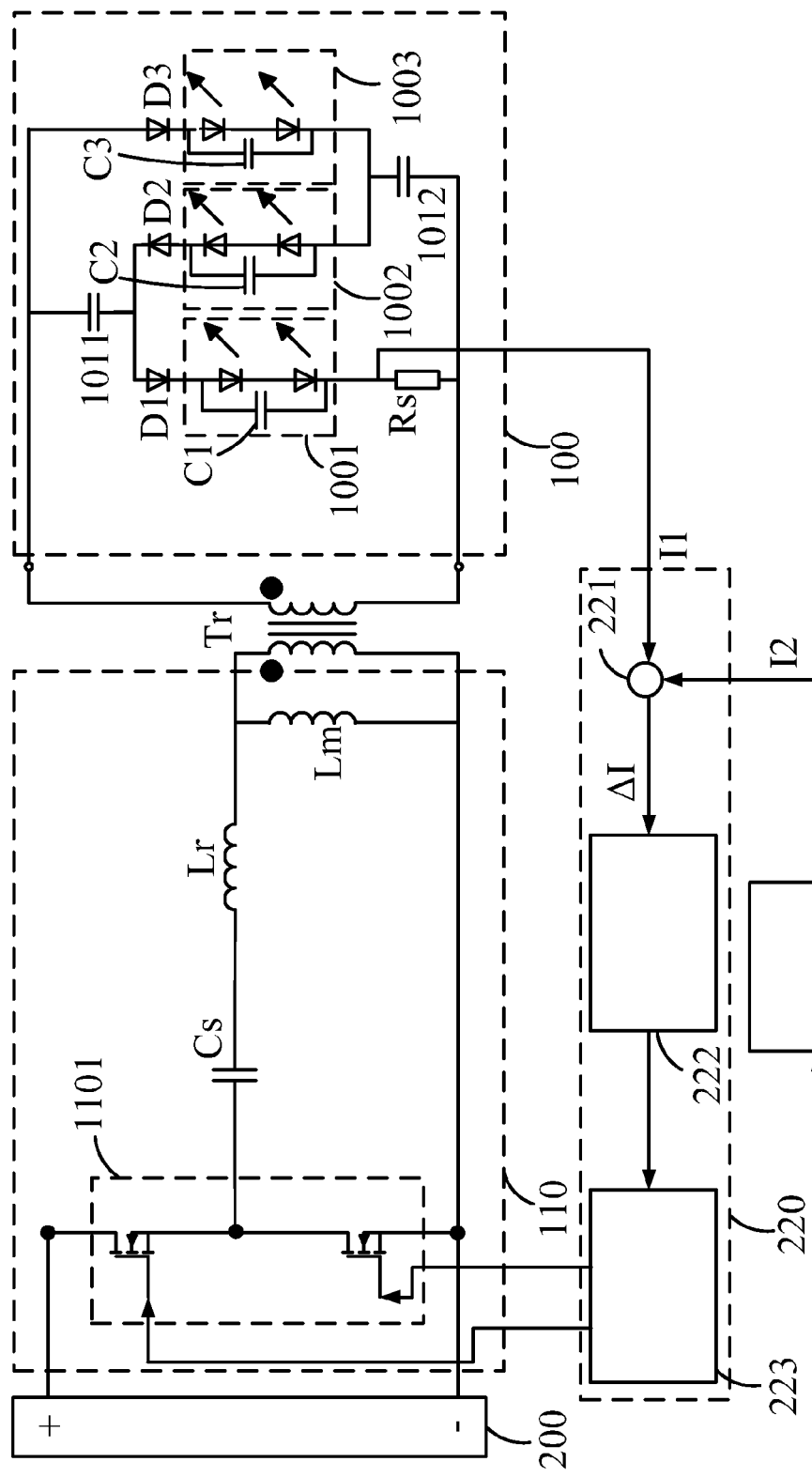
FIG. 2B, FIG. 2C, and FIG. 2D are embodiments of circuit diagrams of the illumination system in FIG. 2A.

FIG. 2B is a circuit diagram of the illumination system in FIG. 2A. The circuit structures of the LED array 100 and the AC current source 110 of the illumination device are the same as those in FIG. 1A and not repeated herein. The output power control module 220 comprises a current comparator 221, a proportional plus integral controller 222, and a switching circuit driver 223. An input terminal of the current comparator 221 obtains a current value of the LED array 100 with a sampling resistor Rs which is coupled to the first LED assembly 1001 in series (all of the LED assemblies of the LED array 100 have the same current values as mentioned above). Another input terminal of the current comparator 221 obtains a reference current value from the light modulation module 210. An output terminal of the current comparator 221 is electrically coupled to an input terminal of the proportional plus integral controller 222. An output terminal of the proportional plus integral controller 222 is electrically coupled to an input terminal of the switching circuit driver 223. An output terminal of the switching circuit driver 223 is electrically coupled to the switching circuit 1101.

Continuing to refer to FIG. 2B, the circuit samples an average current which flows through one LED assembly (i.e. the first LED assembly 1001) by coupling the sampling resistor Rs to the one LED assembly (i.e. the first LED assembly 1001) in series, so as to achieve a closed-loop control on the average current which flows through the one LED assembly. A first current I1 represents the average current of the first LED assembly 1001 which the current comparator 221 obtains with the sampling resistor Rs. A second current I2 represents a current which is outputted by the light modulation module 210. The current comparator 221 obtains a current error signal ΔI by comparing the two currents (ΔI=I2−I1). The current error signal ΔI is inputted to the proportional plus integral controller 222, and the proportional plus integral controller 222 outputs a signal according to the current error signal ΔI for controlling an output frequency of the switching circuit driver 223. When the output frequency of the switching circuit driver 223 is high, an output power of the switching circuit 1101 is low.

Users may modulate the second current I2 by operating the light modulation module 210. When the users desire to increase the illumination brightness of the LED array 100, the second current I2 of the light modulation module 210 is increased by controlling the light modulation module 210 firstly, so as to increase the current error signal ΔI of the current comparator 221. Then, the proportional plus integral controller 222 controls the switching circuit driver 223 for decreasing the output frequency of the switching circuit driver 223, and thus the output power of the switching circuit 1101 is increased. As a result, the objective of increasing the illumination brightness of the LED array 100 is achieved. After the illumination brightness of the LED array 100 is increased, the first current I1 which the current comparator 221 obtains with the sampling resistor Rs is gradually increased as well. Then, the current error signal ΔI of the current comparator 221 is gradually decreased to be zero, and the outputs of the proportional plus integral controller 222 and the switching circuit driver 223 are stable. The closed-loop control enters a stable operation state. Contrarily, an operation of decreasing the illumination brightness is similar to the operation of increasing illumination brightness. The current error signal ΔI is negatively large by decreasing the second current I2, and thus the outputs of the proportional plus integral controller 222 and the switching circuit driver 223 are controlled to achieve the objective of decreasing the output power of the switching circuit 1101. In summary, a light modulation function in the above-mentioned circuit is implemented by controlling the second current I2 which is served as the reference current. The light modulation module 210 is controlled by an external control signal. After processing the external control signal, the light modulation module 210 outputs the second current I2. Therefore, the currents which flow through the LED assemblies (i.e. 1001, 1002, 1003) are controlled by controlling the light modulation module 210 for implementing the light modulation function.

Figure 2C:
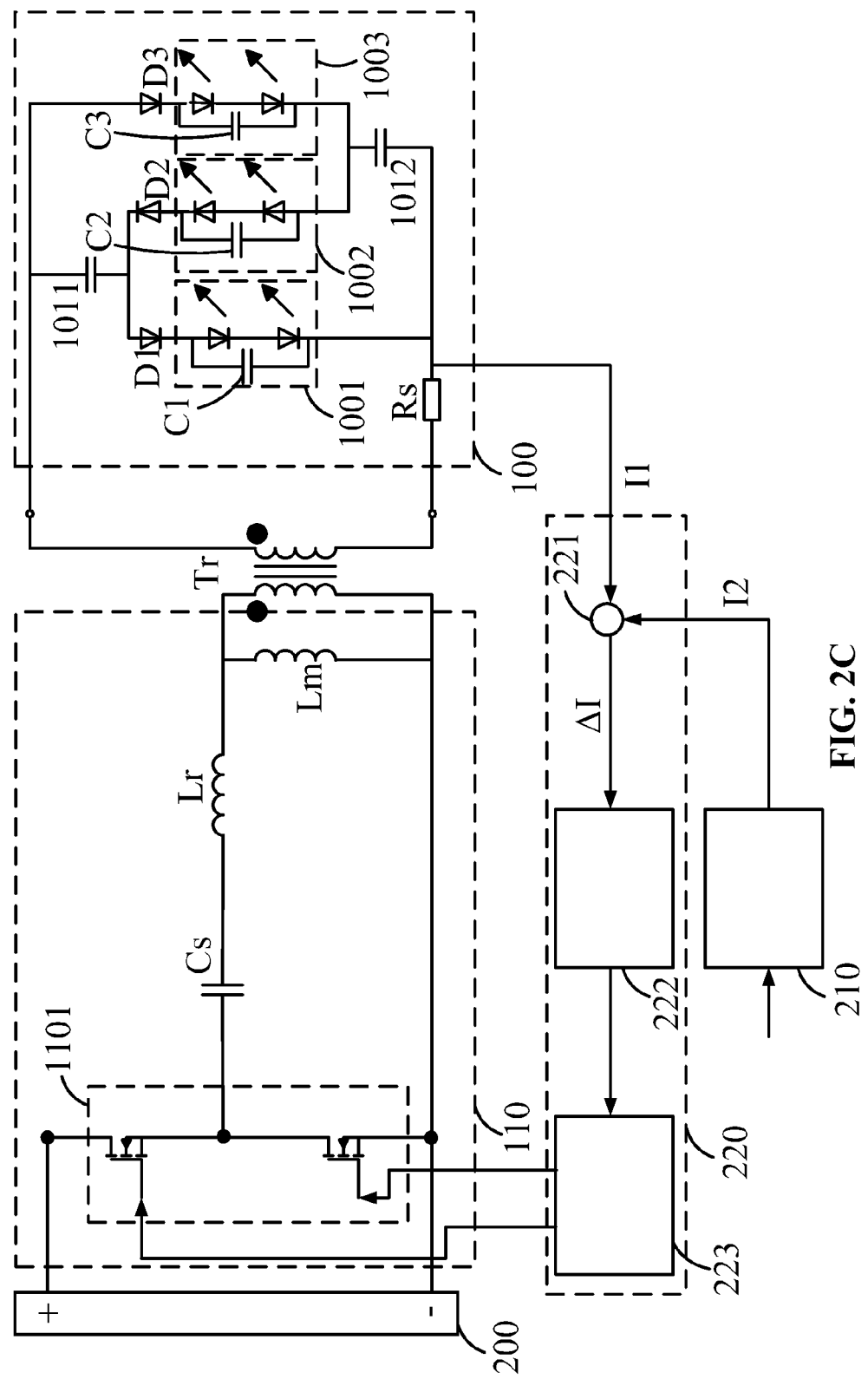
Figure 2D:
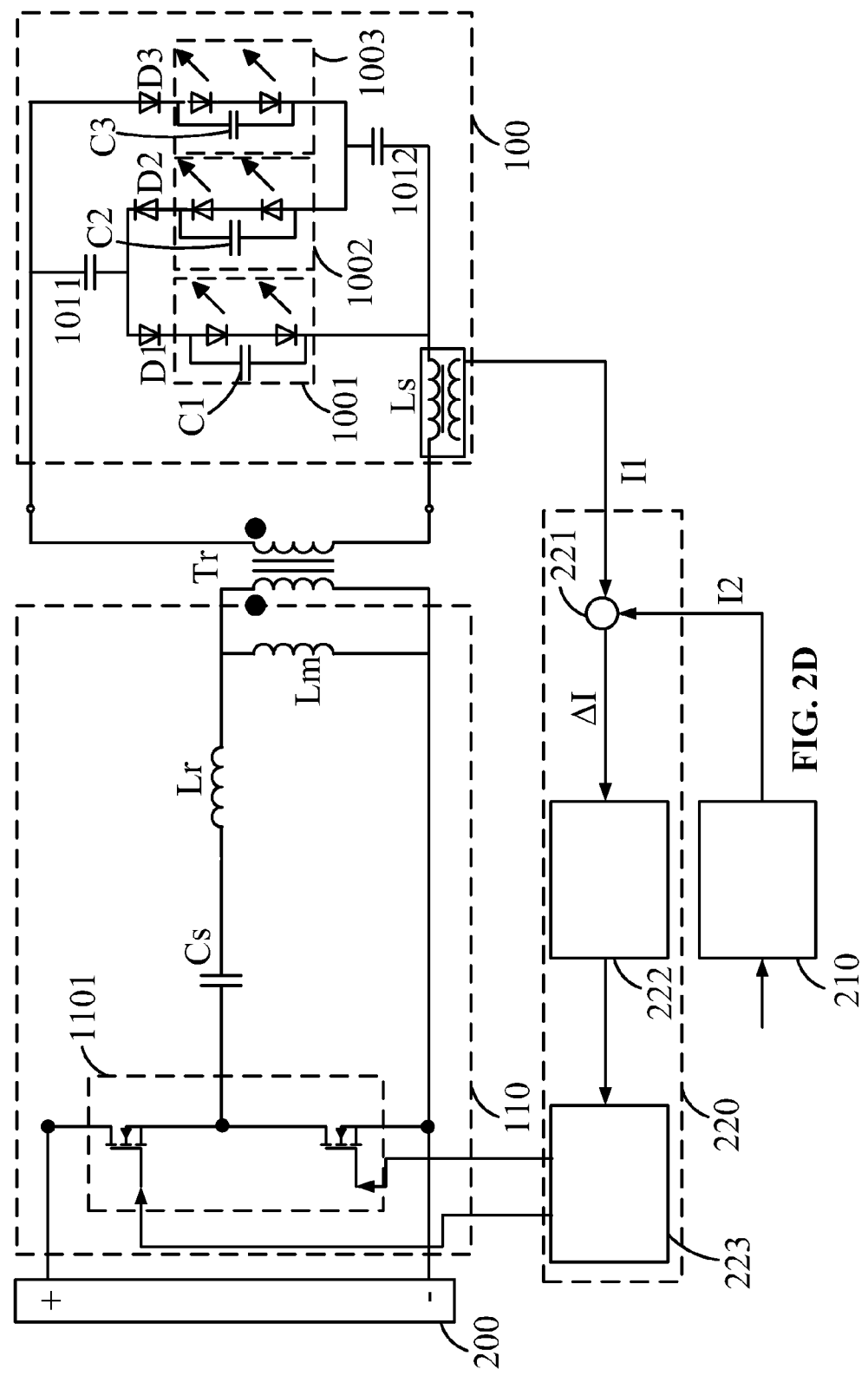

The above-mentioned method of sampling the first current I1 is not limited to the sampling resistor Rs which is coupled to one of the LED assemblies in series. In another method as shown in FIG. 2C, the sampling resistor Rs may be disposed in a main line of the LED array 100, and average currents which flow through the LED assemblies are obtained according to the number of the LED assemblies. In another method as shown in FIG. 2D, a sampling module Ls comprising a sampled inductor and a coupled inductor is substituted for the sampling resistor Rs. Certainly, the sampling module Ls may be disposed in a branch of the LED array 100 as shown in FIG. 2B.

The circuits in FIG. 2B, FIG. 2C, and FIG. 2D may further comprise rectifying diodes D1, D2, and D3 which are respectively coupled to the first LED assembly 1001, the second LED assembly 1002, and the third LED assembly 1003 in series in the same direction. The circuits in FIG. 2B, FIG. 2C, and FIG. 2D may further comprise filtering capacitors C1, C2, and C3 which are respectively coupled to the first LED assembly 1001, the second LED assembly 1002, and the third LED assembly 1003 in parallel. The filtering capacitors C1, C2, and C3 may respectively filter out high frequency components of currents of the LED assemblies (i.e. 1001, 1002, 1003), such that the currents which flow through the LED assemblies (i.e. 1001, 1002, 1003) are more stable, and the life spans of the LEDs of the LED assemblies (i.e. 1001, 1002, 1003) are extended.

The above-mentioned light modulation function is described with the circuit in FIG. 1A. The same light modulation function may be implemented with the circuit in FIG. 1B and is not repeated herein.

Figure 2E:
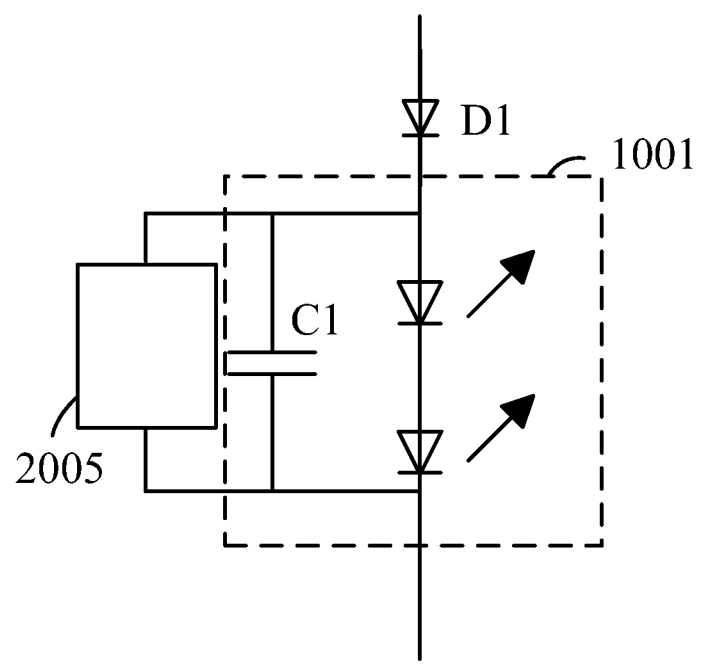
FIG. 2E is a circuit diagram showing that the first LED assembly in FIG. 2B further comprises an over-voltage protection module coupled thereto in parallel.

In the circuit of the present embodiment, each of the LED assemblies (i.e. 1001, 1002, 1003) may further comprise an over-voltage protection module coupled thereto in parallel. FIG. 2E is a circuit diagram showing that the first LED assembly 1001 in FIG. 2B further comprises an over-voltage protection module 2005 coupled thereto in parallel. The over-voltage protection module 2005 is capable of detecting a voltage across the first LED assembly 1001. The over-voltage protection module 2005 becomes a short-circuited state as long as the voltage exceeds a predetermined value. After the over-voltage protection module 2005 becomes the short-circuited state, other LED assemblies are not affected. If the over-voltage protection module 2005 is not disposed and one LED assembly becomes an open-circuited state, other LED assemblies are affected to malfunction and the circuit is damaged. The rectifying diode D1 functions to obstruct a reverse current which flows through the first LED assembly 1001 after the over-voltage protection module becomes the short-circuited state.

Figure 2F:
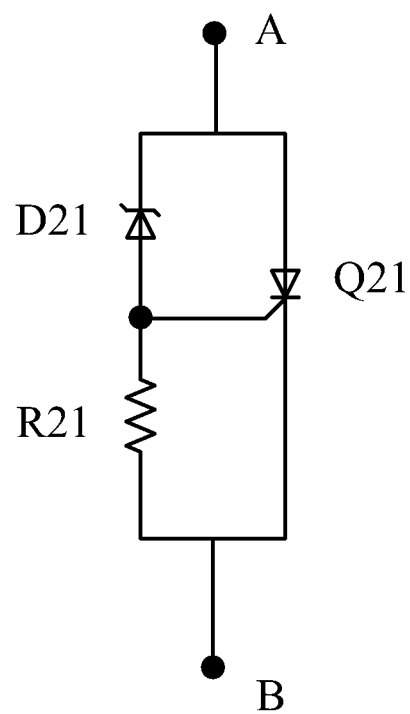
FIG. 2F is a schematic diagram showing an embodiment of the over-voltage protection module.

FIG. 2F is a schematic diagram showing an embodiment of the over-voltage protection module 2005. The over-voltage protection module 2005 comprises a zener diode D21, a thyristor Q21, and a resistor R21. The over-voltage protection module 2005 has terminals A and B. The terminal A is electrically coupled to the positive electrode of the first LED assembly 1001 (FIG. 2E), while the terminal B is electrically coupled to the negative electrode of the first LED assembly 1001 (FIG. 2E). The terminal A is internally and electrically coupled to an anode of the thyristor Q21, while the terminal B is internally and electrically coupled to a cathode of the thyristor Q21. A gate of the thyristor Q21 is electrically coupled to an anode of the zener diode D21, while a cathode of the zener diode D21 is electrically coupled to the terminal A. The resistor R21 is electrically coupled between the gate and the cathode of the thyristor Q21. When the number of the LEDs of the first LED assembly 1001 (FIG. 2E) is great or the first LED assembly 1001 (FIG. 2E) becomes an open-circuited state, a voltage between the terminals A and B is increased. Once the voltage is increased to break down the zener diode D21 such that the thyristor Q21 is turned on, the first LED assembly 1001 (FIG. 2E) becomes a short-circuited state.

An illumination system according to a second embodiment of the present invention is provided in conjunction with appending drawings in the following.

Figure 3:
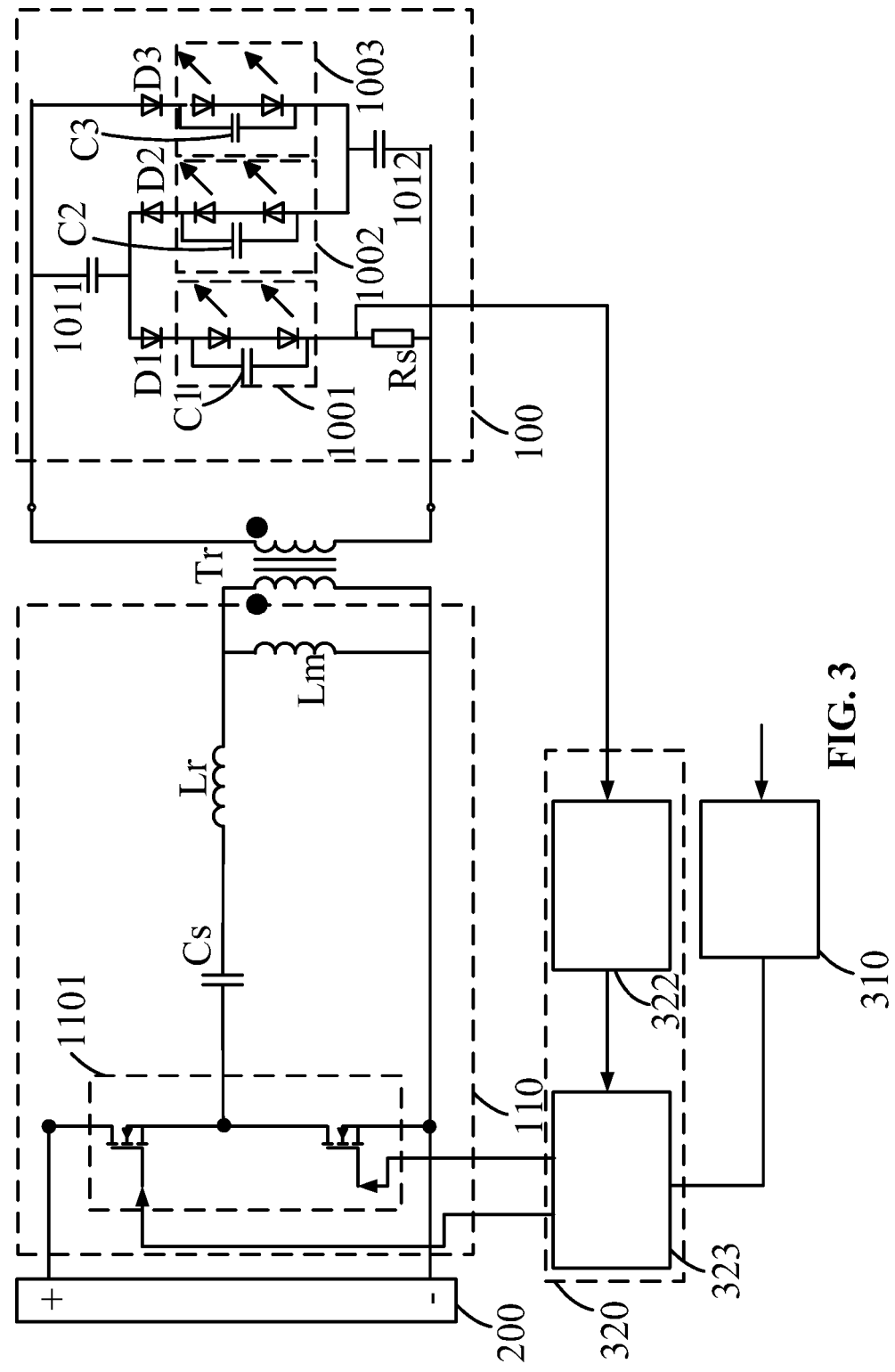
FIG. 3 is a circuit diagram of the illumination system according to the second embodiment of the present invention.

FIG. 3 is a circuit diagram of the illumination system according to the second embodiment of the present invention. The circuit structures of the LED array 100 and the AC current source 110 of the illumination device are the same as those in FIG. 1A and not repeated herein. The output power control module 320 comprises a proportional plus integral controller 322 and a switching circuit river 323. An input terminal of the proportional plus integral controller 322 obtains a current value of the LED array 100 with the sampling resistor Rs which is coupled to the first LED assembly 1001 in series. An output terminal of the proportional plus integral controller 322 is electrically coupled to an input terminal of the switching circuit driver 323. An output terminal of the switching circuit driver 323 is electrically coupled to the switching circuit 1101. The light modulation module 310 is electrically coupled to the switching circuit driver 323.

The light modulation module 310 receives an external light modulation signal and correspondingly outputs a low frequency ON/OFF signal having a variable duty cycle. The low frequency ON/OFF signal is outputted to the switching circuit driver 323 for determining whether the switching circuit driver 323 is enabled or not. For instance, when the light modulation module 310 outputs the ON signal, the switching circuit driver 323 is enabled. Contrarily, when the light modulation module 310 outputs the OFF signal, the switching circuit driver 323 is disabled. When the switching circuit driver 323 is enabled, rated currents flow through the LEDs of each of the LED assemblies (i.e. 1001, 1002, 1003). When the switching circuit driver 323 is disabled, no current flows through the LEDs of each of the LED assemblies (i.e. 1001, 1002, 1003). Accordingly, by adjusting the duty cycle of the low frequency ON/OFF signal outputted by the light modulation module 310, the average currents which flow through the LEDs may be varied for implementing the light modulation function.

The light modulation module 310 in the circuit may also receives an external light modulation signal and correspondingly controls the switching circuit driver 323 to output asymmetrical signals to two control transistors of the switching circuit 1101. The asymmetrical signals are utilized for controlling a turn-on time of one of the control transistors to be great than a turn-on time of the other one of the control transistors, so as to decrease the output power of the AC current source 110. Generally speaking, when a difference of the turn-on times of the two control transistors is greater, the output power of the AC current source 110 is lower.

The above-mentioned light modulation function is described with the circuit in FIG. 1A. The same light modulation function may be implemented with the circuit in FIG. 1B and is not repeated herein.

An illumination system according to a third embodiment of the present invention is provided in conjunction with appending drawings in the following.

Figure 4:
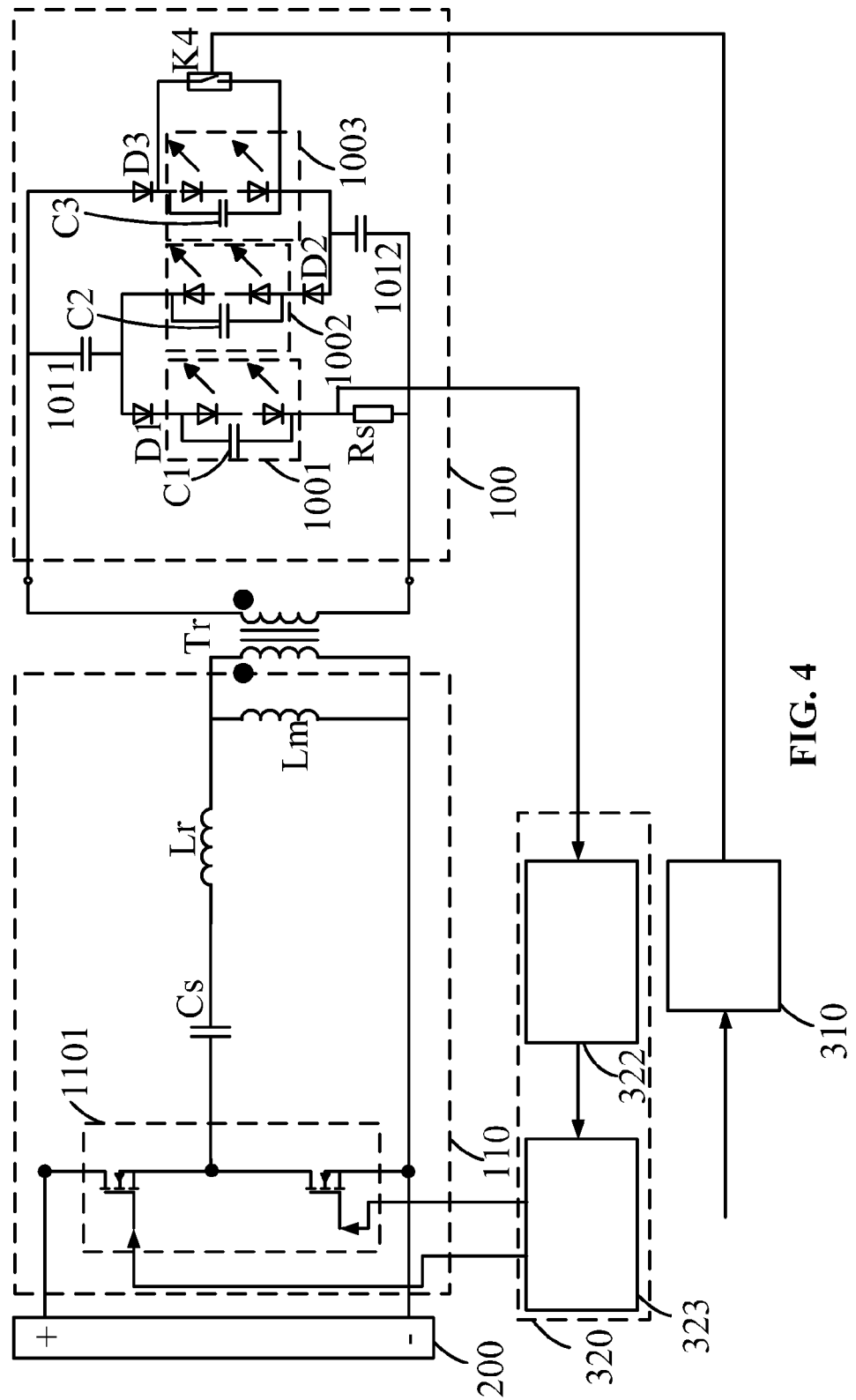
FIG. 4 is a circuit diagram of the illumination system according to the third embodiment of the present invention.

FIG. 4 is a circuit diagram of the illumination system according to the third embodiment of the present invention. The circuit structures of the LED array 100 and the AC current source 110 of the illumination device are the same as those in FIG. 1A and not repeated herein. The output power control module 320, which is the same as that in the second embodiment, comprises the proportional plus integral controller 322 and the switching circuit driver 323. The input terminal of the proportional plus integral controller 322 obtains the current value of the LED array 100 with the sampling resistor Rs which is coupled to the first LED assembly 1001 in series. The output terminal of the proportional plus integral controller 322 is electrically coupled to the input terminal of the switching circuit driver 323. The output terminal of the switching circuit driver 323 is electrically coupled to the switching circuit 1101. The light modulation module 310 controls an operation state of the third LED assembly 1003 with a controllable switch K4 which is coupled to the third LED assembly 1003 in parallel. Apparently, when the controllable switch K4 is turned on, the LEDs of the third LED assembly 1003 become a short-circuited state and thus does not illuminate. In another embodiment, the circuit in FIG. 4 may further comprise more LED assemblies, and each of the LED assemblies may have a controllable switch which is controlled by the light modulation module 310.

A control mechanism of the light modulation module 310 may correspondingly output a plurality of ON/OFF signals having variable duty cycles. The ON/OFF signals respectively control each of the controllable switches to be periodically turned on or off, such that currents which flow through the LED assemblies (i.e. 1001, 1002, 1003) exist and disappear periodically. As a result, by adjusting the duty cycles of the ON/OFF signals outputted by the light modulation module 310, average currents which flow through the LED assemblies (i.e. 1001, 1002, 1003) may be varied for implementing the light modulation function. An advantage of the present embodiment is that the light modulation function of each of the LED assemblies may be controlled independently.

The above-mentioned controllable switches are respectively coupled to the LED assemblies (i.e. 1001, 1002, 1003) in parallel.

An illumination system according to a fourth embodiment of the present invention is provided in conjunction with appending drawings in the following.

Figure 5:
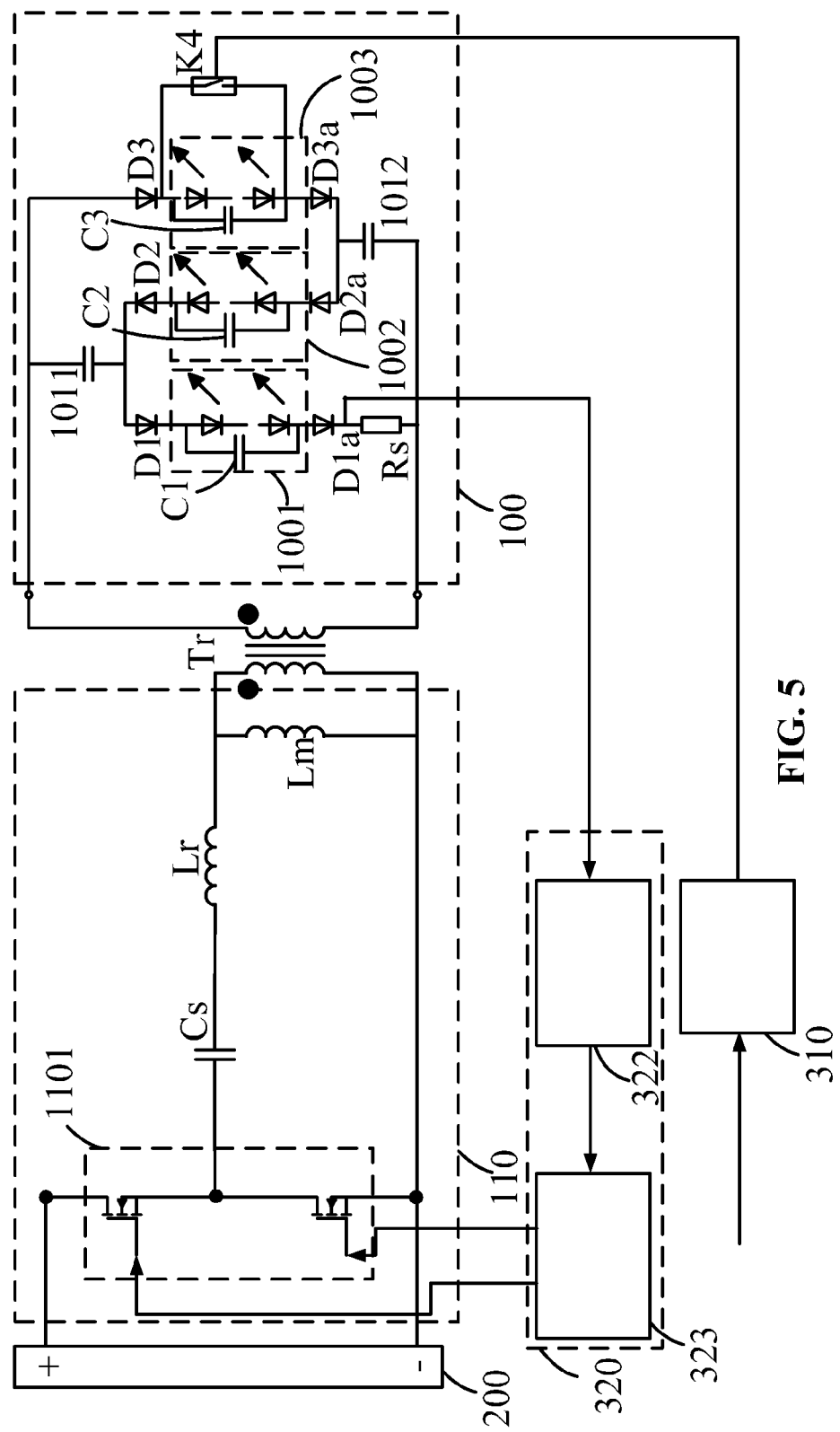
FIG. 5 is a circuit diagram of the illumination system according to the fourth embodiment of the present invention.

FIG. 5 is a circuit diagram of the illumination system according to the fourth embodiment of the present invention. The circuit structures of the LED array 100 and the AC current source 110 of the illumination device are the same as those in FIG. 1A and not repeated herein. The output power control module 320, which is the same as that in the third embodiment, comprises the proportional plus integral controller 322 and the switching circuit driver 323. The operation principles of the proportional plus integral controller 322 and the switching circuit driver 323 may be referred in the third embodiment.

In the present embodiment, the LED array 100 further comprises at least one over-voltage protector, for examples, over-voltage protection diodes D1$a$, D2$a$, and D3$a$. The over-voltage protection diodes D1$a$, D2$a$, and D3$a$ are respectively coupled to the first LED assembly 1001, the second LED assembly 1002, and the third LED assembly in series in the same direction. The over-voltage protection diodes D2$a$ and D3$a$ function to avoid that the positive electrode of the second LED assembly 1002 is directly coupled to the negative electrode of the third LED assembly 1003. If the positive electrode of the second LED assembly 1002 is directly coupled to the negative electrode of the third LED assembly 1003, a high voltage is generated between any two terminals of the second LED assembly 1002 and the third LED assembly 1003. When the LED array 100 comprises four LED assemblies as shown in FIG. 1B or FIG. 1C, the over-voltage protection diode D1$a$ functions to insulate the first LED assembly from the fourth LED assembly. The over-voltage protectors may be other devices which have the over-voltage function.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims

What is claimed is:

1. An illumination device, comprising:
a light emitting diode (LED) array, comprising a first LED assembly, a second LED assembly, a third LED assembly, a first current-sharing unit, and a second current-sharing unit; and
an alternating current (AC) current source, providing power for the LED array, wherein a first output terminal of the AC current source is electrically coupled to a first terminal of the first current-sharing unit and a positive electrode of the third LED assembly,
a second terminal of the first current-sharing unit is electrically coupled to a positive electrode of the first LED assembly and a negative electrode of the second LED assembly, the first current-sharing unit is utilized for performing a current-sharing operation on the first LED assembly and the second LED assembly,
a negative electrode of the first LED assembly is electrically coupled to a second output terminal of the AC current source,
a first terminal of the second current-sharing unit is electrically coupled to the second output terminal of the AC current source, a second terminal of the second current-sharing unit is electrically coupled to a positive electrode of the second LED assembly and a negative electrode of the third LED assembly, the second current-sharing unit is utilized for performing a current-sharing operation on the second LED assembly and the third LED assembly.

2. The illumination device of claim 1, wherein the first current-sharing unit and the second current-sharing unit are capacitors.

3. The illumination device of claim 1, wherein the AC current source comprises:

a switching circuit, an input terminal of the switching circuit being electrically coupled to a direct current (DC) voltage source;
a resonant capacitor; and
a resonant inductor, wherein a first output terminal of the switching circuit is electrically coupled to a first terminal of the resonant capacitor, a second terminal of the resonant capacitor is electrically coupled to a first terminal of the resonant inductor, a second terminal of the resonant inductor is electrically coupled to the first output terminal of the AC current source,
a second output terminal of the switching circuit is electrically coupled to the second output terminal of the AC current source.

4. The illumination device of claim 3, further comprising an isolation transformer, wherein a first input terminal of the isolation transformer is electrically coupled to the second terminal of the resonant inductor, a second input terminal of the isolation transformer is electrically coupled to the second output terminal of the switching circuit,
a first output terminal and a second output terminal of the isolation transformer are respectively served as the first output terminal and the second output terminal of the AC current source.

5. The illumination device of claim 3, wherein the AC current source further comprises an excitation inductor, a first terminal of the exciting inductor is electrically coupled to the second terminal of the resonant inductor, and a second terminal of the excitation inductor is electrically coupled to the second output terminal of the switching circuit.

6. The illumination device of claim 1, wherein the first current-sharing unit and the first LED assembly of the LED array further constitute a first standard component, the second current-sharing unit and the second LED assembly further constitute a second standard component, and the first standard component and the second standard component have the same internal connections and external terminals.

7. The illumination device of claim 6, wherein the first standard component further comprises a first over-voltage protection module, the second standard component further comprises a second over-voltage protection module, the first over-voltage protection module is coupled to the first LED assembly in parallel, the second over-voltage protection module is coupled to the second LED assembly in parallel, and the first over-voltage protection module and the second over-voltage protection module are respectively utilized for preventing voltages across the first LED assembly and the second LED assembly from exceeding a predetermined value.

8. The illumination device of claim 7, wherein the first standard component further comprises a first rectifying diode which is coupled to the first LED assembly in series in the same direction, and the second standard component further comprises a second rectifying diode which is coupled to the second LED assembly in series in the same direction.

9. The illumination device of claim 7, wherein the first standard component further comprises a first filtering capacitor which is coupled to the first LED assembly in parallel, and the second standard component further comprises a second filtering capacitor which is coupled to the second LED assembly in parallel.

10. The illumination device of claim 7, wherein the first standard component further comprises a first over-voltage protection diode, the second standard component further comprises a second over-voltage protection diode, the first over-voltage protection diode is coupled to the first LED assembly in series in the same direction, the second over-voltage protection diode is coupled to the second LED assembly in series in the same direction, and the first over-voltage protection diode and the second over-voltage protection diode are respectively utilized for preventing voltages between two terminals of the first LED assembly and the second LED assembly from exceeding another predetermined value.

11. An illumination system, comprising:
an illumination device, comprising:
a light emitting diode (LED) array;
an alternating current (AC) current source, electrically coupled to the LED array for providing power for the LED array; and
an output power control module, electrically coupled to the LED array and the AC current source, wherein the LED array provides information on an internal current of the LED array for the output power control module, and the LED array, the AC current source, and the output power control module together form a closed-loop control loop for implementing a closed-loop control on an output power of the AC current source; and
a light modulation module, electrically coupled to the closed-loop control loop for modulating illumination brightness of the LED array,
wherein the LED array comprises a first LED assembly, a second LED assembly, a third LED assembly, a first current-sharing unit, and a second current-sharing unit, a first output terminal of the AC current source is electrically coupled to a first terminal of the first current-sharing unit and a positive electrode of the third LED assembly, a second terminal of the first current-sharing unit is electrically coupled to a positive electrode of the first LED assembly and a negative electrode of the second LED assembly, the first current-sharing unit is utilized for performing a current-sharing operation on the first LED assembly and the second LED assembly, a negative electrode of the first LED assembly is electrically coupled to a second output terminal of the AC current source, a first terminal of the second current-sharing unit is electrically coupled to the second output terminal of the AC current source, a second terminal of the second current-sharing unit is electrically coupled to a positive electrode of the second LED assembly and a negative electrode of the third LED assembly, the second current-sharing unit is utilized for performing a current-sharing operation on the second LED assembly and the third LED assembly.

12. The illumination system of claim 11, wherein the output power control module comprises a current comparator, a proportional plus integral controller, and a switching circuit driver,
a first input terminal of the current comparator is electrically coupled to the LED array for obtaining a current value of the LED array, a second input terminal of the current comparator is electrically coupled to the light modulation module for obtaining a reference current value,
an input terminal of the proportional plus integral controller is electrically coupled to an output terminal of the current comparator, an output terminal of the proportional plus integral controller is electrically coupled to an input terminal of the switching circuit driver for modulating an output frequency of the switching circuit driver according to an output of the current comparator,
an output terminal of the switching circuit driver is electrically coupled to the AC current source for modulating an output power of the AC current source.

13. The illumination system of claim 12, wherein the LED array further comprises a sampling resistor which is coupled to one of the first LED assembly, the second LED assembly, and the third LED assembly in series, and the current comparator obtains the current value of the LED array by obtaining a voltage value across the sampling resistor.

14. The illumination system of claim 12, wherein the LED array further comprises a sampled inductor which is coupled to one of the first LED assembly, the second LED assembly, and the third LED assembly in series, and the current comparator obtains the current value of the LED array by disposing a coupled inductor which is coupled to the sampled inductor.

15. The illumination system of claim 11, wherein the output power control module comprises a proportional plus integral controller and a switching circuit driver,
an input terminal of the proportional plus integral controller is electrically coupled to the LED array, an output terminal of the proportional plus integral controller is electrically coupled to an input terminal of the switching circuit driver,
an output terminal of the switching circuit driver is electrically coupled to the AC current source for modulating an output power of the AC current source,
an output terminal of the light modulation module is electrically coupled to the switching circuit driver for directly modulating an output frequency of the switching circuit driver, so as to modulate the output power of the AC current source and the illumination brightness of the LED array.

16. The illumination system of claim 11, wherein the LED array further comprises a controllable switch, the controllable switch is coupled to one of the first LED assembly, the second LED assembly, and the third LED assembly in parallel, the light modulation module is electrically coupled to the controllable switch for controlling the controllable switch to be turned on or turned off, so as to control an operation state of the LED assembly which is electrically coupled to the controllable switch and to control the illumination brightness of the LED array.

17. A lamp, comprising:
a lamp board; and
a driving board, electrically coupled to the lamp board through wirings, wherein the lamp board comprises a light emitting diode (LED) array, the driving board comprises an alternating current (AC) current source, and the LED array comprises a first LED assembly, a second LED assembly, a third LED assembly, a first current-sharing unit, and a second current-sharing unit, a first output terminal of the AC current source is electrically coupled to a first terminal of the first current-sharing unit and a positive electrode of the third LED assembly, a second terminal of the first current-sharing unit is electrically coupled to a positive electrode of the first LED assembly and a negative electrode of the second LED assembly, the first current-sharing unit is utilized for performing a current-sharing operation on the first LED assembly and the second LED assembly, a negative electrode of the first LED assembly is electrically coupled to a second output terminal of the AC current source, a first terminal of the second current-sharing unit is electrically coupled to the second output terminal of the AC current source, a second terminal of the second current-sharing unit is electrically coupled to a positive electrode of the second LED assembly and a negative electrode of the third LED assembly, the second current-sharing unit is utilized for performing a current-sharing operation on the second LED assembly and the third LED assembly.

18. The lamp of claim 17, wherein the first current-sharing unit and the first LED assembly of the LED array further constitute a first standard component, the second current-sharing unit and the second LED assembly further constitute a second standard component, and the first standard component and the second standard component have the same internal connections and external terminals.

19. The lamp of claim 18, wherein the first standard component further comprises a first over-voltage protection module, the second standard component further comprises a second over-voltage protection module, the first over-voltage protection module is coupled to the first LED assembly in parallel, the second over-voltage protection module is coupled to the second LED assembly in parallel, and the first over-voltage protection module and the second over-voltage protection module are respectively utilized for preventing voltages across the first LED assembly and the second LED assembly from exceeding a predetermined value.

20. The lamp of claim 19, wherein the first standard component further comprises a first rectifying diode which is coupled to the first LED assembly in series in the same direction, and the second standard component further comprises a second rectifying diode which is coupled to the second LED assembly in series in the same direction.

21. The lamp of claim 20, wherein the first standard component further comprises a first filtering capacitor which is coupled to the first LED assembly in parallel, and the second standard component further comprises a second filtering capacitor which is coupled to the second LED assembly in parallel.

22. The lamp of claim 21, wherein the first standard component further comprises a first over-voltage protection diode, the second standard component further comprises a second over-voltage protection diode, the first over-voltage protection diode is coupled to the first LED assembly in series in the same direction, the second over-voltage protection diode is coupled to the second LED assembly in series in the same direction, and the first over-voltage protection diode and the second over-voltage protection diode are respectively utilized for preventing voltages between two terminals of the first LED assembly and the second LED assembly from exceeding another predetermined value.

23. The lamp of claim 17, wherein the driving board further comprises a light modulation module and an output power control module, the AC current source is electrically coupled to the LED array for providing power for the LED array, the output power control module is electrically coupled to the LED array and the AC current source, the LED array is utilized for providing information on an internal current of the LED array for the output power control module, the LED array, the AC current source, and the output power control module together form a closed-loop control loop for implementing a closed-loop control on an output power of the AC current source, the light modulation module is electrically coupled to the closed-loop control loop for modulating illumination brightness of the LED array.

\* \* \* \* \*